(12) United States Patent
Yamine et al.

(10) Patent No.: US 12,493,096 B2
(45) Date of Patent: Dec. 9, 2025

(54) HANDLING RADIO FINGERPRINTS IN A WIRELESS COMMUNICATION NETWORK

(71) Applicant: Telefonaktiebolaget LM Ericsson (publ), Stockholm (SE)

(72) Inventors: Badawi Yamine, Beirut (LB); Iana Siomina, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 383 days.

(21) Appl. No.: 18/247,932

(22) PCT Filed: Oct. 6, 2020

(86) PCT No.: PCT/SE2020/050949
§ 371 (c)(1),
(2) Date: Apr. 5, 2023

(87) PCT Pub. No.: WO2022/075893
PCT Pub. Date: Apr. 14, 2022

(65) Prior Publication Data
US 2023/0375658 A1  Nov. 23, 2023

(51) Int. Cl.
*G01S 5/02* (2010.01)
*H04B 17/309* (2015.01)
*H04W 64/00* (2009.01)

(52) U.S. Cl.
CPC ........ *G01S 5/0244* (2020.05); *G01S 5/02521* (2020.05); *G01S 5/0284* (2013.01); *H04B 17/309* (2015.01); *H04W 64/006* (2013.01)

(58) Field of Classification Search
None
See application file for complete search history.

(56) References Cited

U.S. PATENT DOCUMENTS

| 7,724,717 B2 * | 5/2010 | Porras | H04W 12/06 370/332 |
| 10,397,810 B2 * | 8/2019 | Yang | H04W 24/04 |

(Continued)

FOREIGN PATENT DOCUMENTS

| CN | 110557829 A | 12/2019 |
| WO | 2009134174 A1 | 11/2009 |
| WO | 2017118380 A1 | 7/2017 |

OTHER PUBLICATIONS

International Search Report and Written Opinion dated May 25, 2021 for International Patent Application No. PCT/SE2020/050949 filed Oct. 6, 2020, consisting of 9-pages.

(Continued)

*Primary Examiner* — Adolf Dsouza
(74) *Attorney, Agent, or Firm* — Weisberg I.P. Law, P.A.

(57) ABSTRACT

A method performed by a radio node for handling a radio fingerprint during network degradation in a wireless communications network is provided. The radio node obtains an indication about a network degradation at location X in the wireless communications network. The radio node decides whether one or more radio fingerprints of respective one or more User Equipments, UEs, are suffering from the network degradation at location X. When one or more radio fingerprints of respective one or more UEs are suffering from the network degradation at location X, the radio node provides to the one or more UEs an indication that the location X is suffering from the network degradation. The indication enables the one or more UEs to handle their respective radio fingerprints during the network degradation at location X.

20 Claims, 13 Drawing Sheets

---

201. Obtain from first UE, radio fingerprint indicating location L.

202. Obtain indication about network degradation at location X.

203. Decide whether one or more radio fingerprints of respective one or more UEs are suffering from the network degradation at location X 204. Provide to one or more UEs, an indication that location X is suffering from the network degradation.

(56) References Cited

U.S. PATENT DOCUMENTS

| | | | |
|---|---|---|---|
| 2007/0025265 A1 | 2/2007 | Porras et al. | |
| 2013/0084892 A1 | 4/2013 | Teyeb et al. | |
| 2015/0341895 A1* | 11/2015 | Zhang | G01S 5/02527 455/456.1 |
| 2023/0180072 A1* | 6/2023 | Ranjan | H04W 48/18 455/436 |

OTHER PUBLICATIONS

ETSI TS 136 331 V15.9.0; Technical Specification; LTE; Evolved Universal Terrestrial Radio Access (E-UTRA); Radio Resource Control (RRC); Protocol Specification (3GPP TS 36.331 version 15.9.0 Release 15); Apr. 2020; consisting of 969-pages.

3GPP TS 38.331 V15.9.0; 3rd Generation Partnership Project; Technical Specification Group Radio Access Network;. NR; Radio Resource Control (RRC) protocol specification (Release 15); Mar. 2020; consisting of 536-pages.

\* cited by examiner

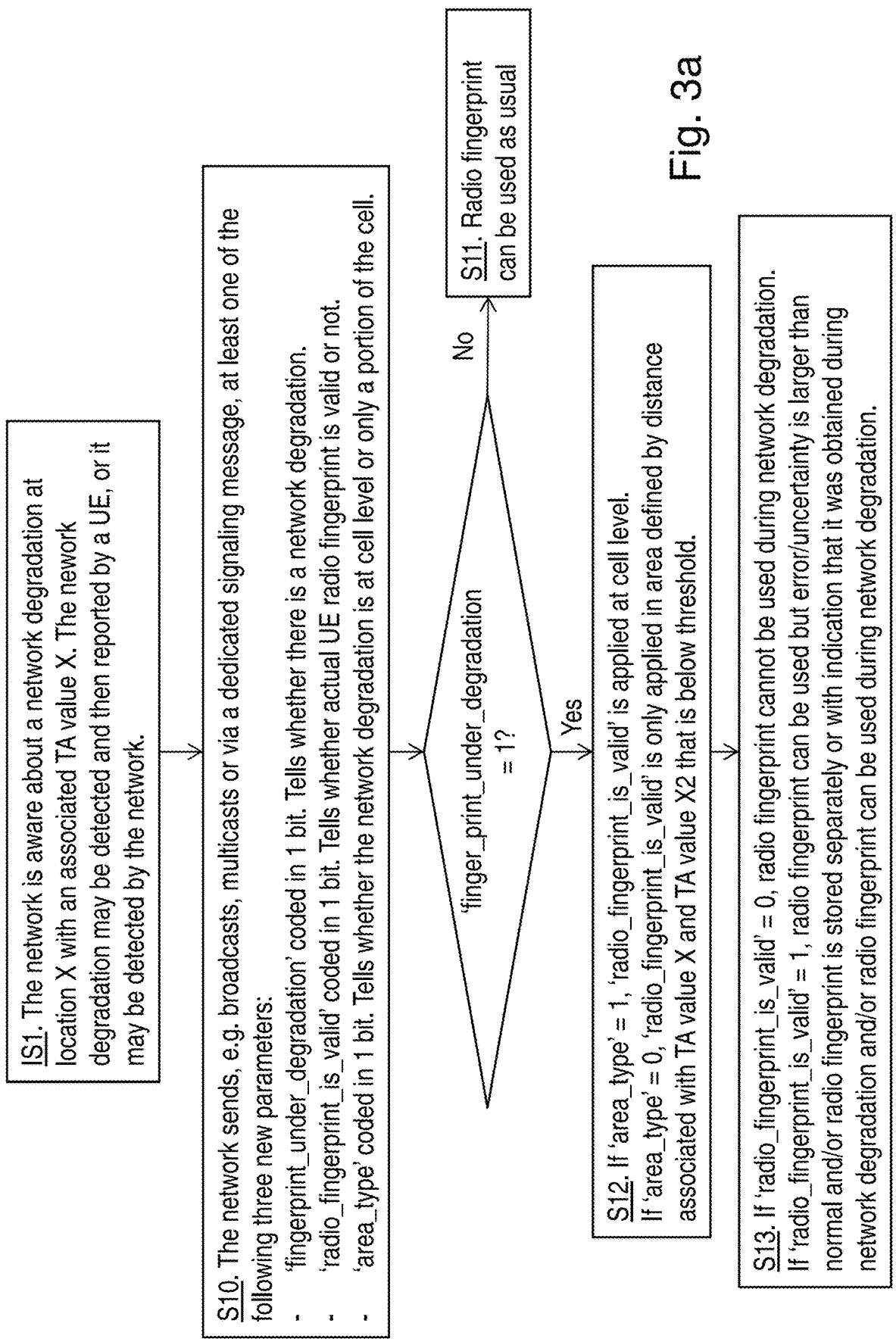

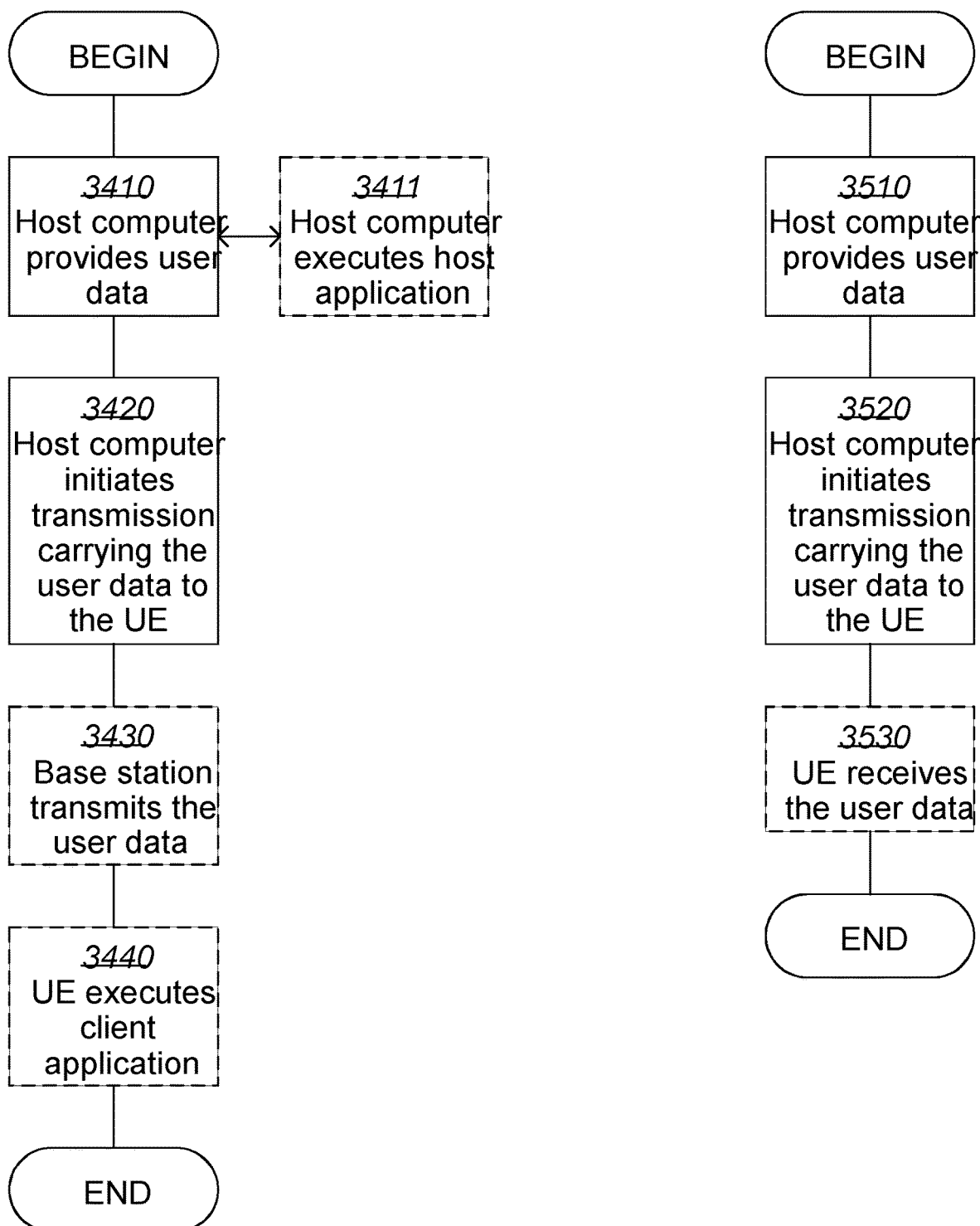
Fig. 7　　　　　　　　　　　　　　　　　　Fig. 8

HANDLING RADIO FINGERPRINTS IN A WIRELESS COMMUNICATION NETWORK

CROSS-REFERENCE TO RELATED APPLICATIONS

This application is a Submission Under 35 U.S.C. § 371 for U.S. National Stage Patent Application of International Application Number: PCT/SE2020/050949, filed Oct. 6, 2020 entitled "RADIO NODE AND METHOD IN A WIRELESS COMMUNICATIONS NETWORK," the entirety of which is incorporated herein by reference.

TECHNICAL FIELD

Embodiments herein relate to a radio node and a method therein. In some aspects, they relate to handling radio fingerprints during a network degradation in a wireless communications network.

BACKGROUND

In a typical wireless communication network, wireless devices, also known as wireless communication devices, mobile stations, stations (STA) and/or User Equipments (UE), communicate via a Local Area Network such as a WiFi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5th Generation (5G). A service area or cell area is a geographical area where radio coverage is provided by the radio network node. The radio network node communicates over an air interface operating on radio frequencies with the wireless device within range of the radio network node. The radio network node communicates to the wireless device in DownLink (DL) and from the wireless device in UpLink (UL).

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3rd Generation (3G) networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of hotspots. 5G research and development also aims at improved support of machine to machine communication, also known as the Internet of things, aiming at lower cost, lower battery consumption and lower latency than 4G equipment.

Positioning Latency in LTE and Other Cellular Systems

Positioning in LTE is e.g. described in "Positioning in LTE, Handbook of Position Location, Theory Practice and Advances, chapter 32, Hoboken: NJ, IEEE Press & Wiley, 2012", by authors A. Kangas, I. Siomina and T. Wigren.

In particular it describes a positioning architecture, positioning methods and their performance. The following positioning methods are available in the LTE cellular system:

Cell Identity (CID)—Determines the UE position with cell granularity.
Enhanced Cell Identity (E-CID)—Cell identity is combined with auxiliary radio measurements such as:
Timing Advance (TA)
UE Rx-Tx—UE frame latency
Angle of Arrival (AoA)
Radio signal strength related measurements
Radio Frequency (RF) fingerprinting
Adaptive Enhanced Cell Identity (AECID)
Observed Time Difference of Arrival (OTDOA)
Uplink Time Difference of Arrival (U-TDOA)
Assisted Global Navigation Satellite System (A-GNSS)—Satellite based positioning including Assisted Global Positioning System (A-GPS), Galileo and Global Navigation Satellite System (GLONASS)

The above publication also discusses the positioning times of the listed positioning methods (protocol delays are not taken into account and would needed to be also added). The following rough figures may be given as an indication of the positioning times of the listed positioning methods:

CID—much less than a second
E-CID—much less than a second to 2-3 seconds
RF-fingerprinting—1-10 seconds depending on filtering
AECID—less than a second to 2-3 seconds
OTDOA—3-20 s
U-TDOA—3-20 s
A-GNSS—5-30 s Positioning times are similar in other cellular systems. The times may be much longer for low complexity UEs such as Machine Type Communication (MTC) or Narrowband (NB)-Internet of Things (IoT) UEs. The most commonly used method for a low complexity UE to report its location comprises reporting a cell identity of cell where it is located.

Radio fingerprint positioning is one among many other positioning procedures that are used in wireless networks to locate a UE. In a radio fingerprint method, the UE considers that whenever it encounters a particular radio condition from some specific cell, that means that the UE is at a certain specific location. Such radio fingerprint method is useful in many scenarios, following are three examples:

The UE is a low complex UE, e.g. a smart sensor, which does not have a Global Positioning System (GPS) support installed in its circuitry. Internet of Things (IoT) smart sensors that does not have GPS are implemented everywhere in the network.

The UE is a normal UE but GPS is not enabled.

In patent US20130084892A1 "Methods and Arrangements for Proximity Detection" where the radio fingerprint is used by a normal UE as means for being closed to a CSG (Closed Subscribers Group) cell.

In every live wireless network, every geographical area might be susceptible at any time to any type of network degradation. This could be due to many reasons, e.g. that a cell went down due to a hardware or software issue, an area located in a specific geographical location where signals do not arrive well because of e.g. many buildings and walls or a radio link failure. Under normal radio conditions the radio fingerprint procedure works based on two steps:

1. The network has a radio coverage map, map_fingerprint, composed of reported UE radio fingerprints and each radio fingerprint corresponds a geographical location.
2. A UE reports a radio fingerprint to the network from its actual location. The network consults the map_fingerprint and thus obtains the UE location. In some cases the UE evaluate its radio fingerprint to perform some of its predefined without reporting the radio fingerprint to the network.

If the UE is located in an area suffering from a network degradation, the radio fingerprint of the UE will be corrupted, i.e. it will not give the correct location when evaluated by either the network or the UE.

As a consequence, the corrupted radio fingerprint caused by the network degradation may result in that the location determined from the radio fingerprint is incorrect.

SUMMARY

As part of developing embodiments herein a problem was identified by the inventors and will first be discussed.

A problem is that there is neither a way for the network, nor a UE, to handle radio fingerprints that has been corrupted due to suffering from a network degradation. This is since there is no way for the network to let the UE know about the presence and location of the network degradation and that radio fingerprints suffering from the network degradation may be corrupted and thus indicate an incorrect location. This may lead to incorrect position of UEs, failure in location based services, and thus a decreased performance of the wireless communications network.

An object of embodiments herein is to improve the performance of a wireless communications network.

According to an aspect of embodiments herein, the object is achieved by a method performed by a radio node for handling a radio fingerprint during network degradation in a wireless communications network.

The radio node obtains an indication about a network degradation at location X in the wireless communications network.

The radio node decides whether one or more radio fingerprints of respective one or more User Equipments, UEs, are suffering from the network degradation at location X.

When one or more radio fingerprints of respective one or more UEs are suffering from the network degradation at location X, the radio node provides to the one or more UEs an indication that the location X is suffering from the network degradation. The provided indication enables the one or more UEs to handling their respective radio fingerprints during the network degradation at location X.

According to another aspect of embodiments herein, the object is achieved by a radio node configured to handle a radio fingerprint during network degradation in a wireless communications network. The radio node is further configured to:

obtain an indication about a network degradation at location X in the wireless communications network, decide whether one or more radio fingerprints of respective one or more UEs are suffering from the network degradation at location X, when one or more radio fingerprints of respective one or more UEs are suffering from the network degradation at location X, provide to the one or more UEs an indication that the location X is suffering from the network degradation, which indication is adapted to enable the one or more UEs to handling their respective radio fingerprints during the network degradation at location X.

Thanks to that the radio node obtains information about a network degradation at location X, it is possible for the radio node to decide whether one or more radio fingerprints of respective one or more UEs is suffering from the degradation. The radio node can then provide an indication to the one or more UEs that location X is suffering from the network degradation. The one or more UEs are then enabled to handle its radio fingerprints given the network degradation at location X. In this way an efficient mechanism improving the handling of radio fingerprints during a network degradation is achieved.

Embodiments herein brings the advantage of an efficient mechanism improving the handling of radio fingerprints during a network degradation. This is achieved by making it possible for both the network and the UEs to be aware of any change in UE radio fingerprints, which leads to a more efficient method for handling radio fingerprints during a network degradation for UEs relying on radio fingerprint positioning. This results in an improved performance of radio nodes in an wireless communications network.

BRIEF DESCRIPTION OF THE DRAWINGS

Examples of embodiments herein are described in more detail with reference to attached drawings in which:

FIGS. 7 to 10 are flowcharts illustrating methods implemented in a communication system including a host computer, a base station and a user equipment.

DETAILED DESCRIPTION

Example embodiments herein provide methods that improves the handling of radio fingerprints during a network degradation by allowing a radio node that learns about the network degradation to provide an indication to UEs about the network degradation. This enables UEs to handle their radio fingerprints that suffers from the network degradation.

Further, embodiments herein provide methods that improves the handling of radio fingerprints during a network degradation by defining new parameters that is provided to UEs in the indication about the network degradation, thereby informing the UEs about the presence of the network degradation, the location of the network degradation, the validity of the radio fingerprint of the UE and the type of network degradation. This results in an improved performance of the wireless communications network handling radio fingerprints during a network degradation.

Figure 1A:
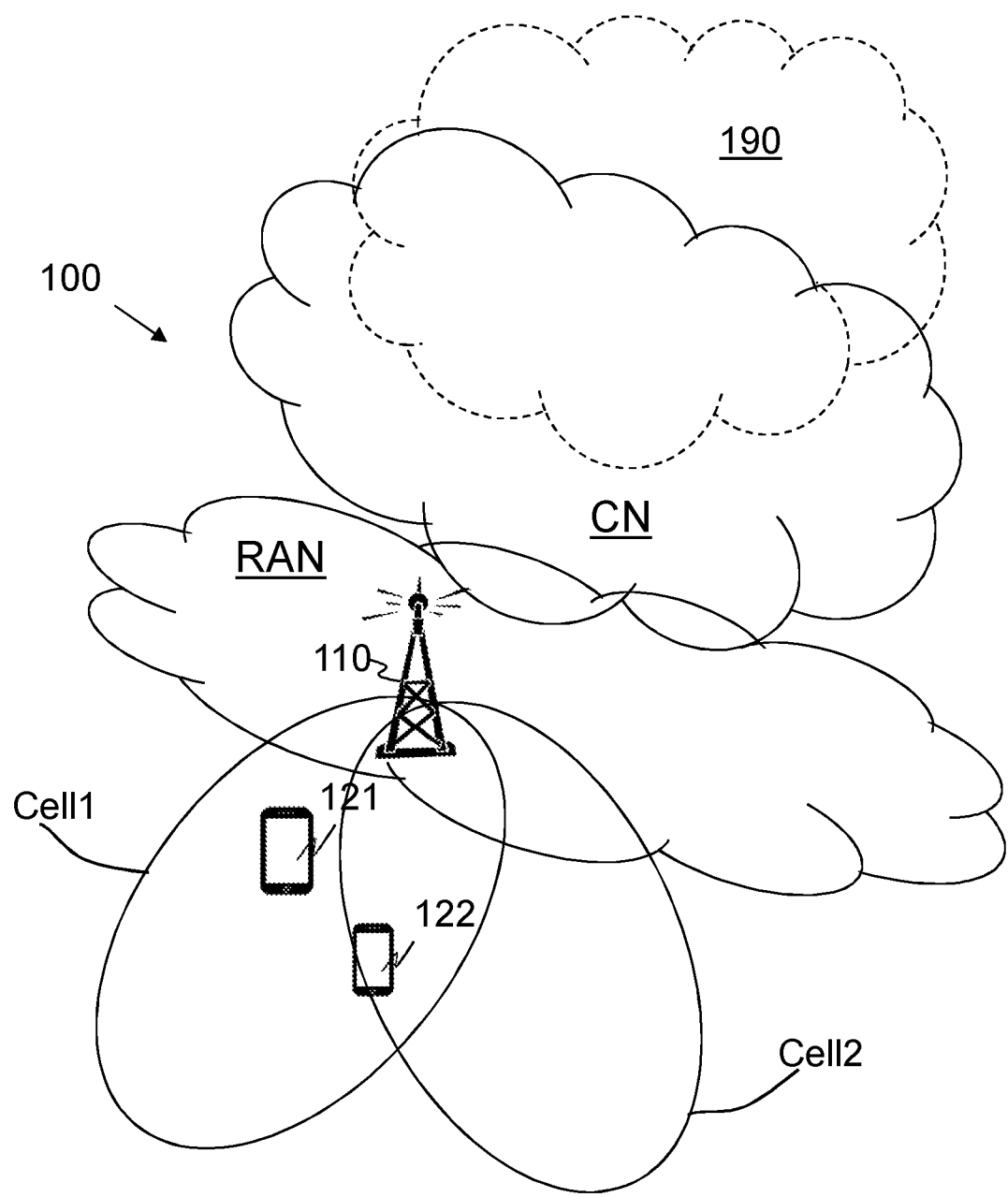
FIG. 1a is a schematic block diagram illustrating embodiments of a wireless communications network.

FIG. 1a is a schematic overview depicting a wireless communications network 100 wherein embodiments herein may be implemented. The wireless communications network 100 comprises one or more RANs and one or more CNs. The wireless communications network 100 may use 5G NR but may further use a number of other different technologies, such as, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

One or more UEs such as e.g. a UE 121, and a UE 122 operate in the wireless communications network 100. In some embodiments herein the UE 121 may be a radio node and is in these embodiments referred to as the radio node 121. The UEs 121, 122 may be referred to as the first UE 121 and the second UE 122. The respective UE 121, 122 may e.g. be a wireless device, an NR device, a mobile station, a wireless terminal, an NB-IoT device, an MTC device, an eMTC device, a CAT-M device, a WiFi device, an LTE device and an a non-access point (non-AP) STA, a STA, that communicates via a base station such as e.g. a network node 110, one or more Access Networks (AN), e.g. a RAN, to one or more core networks (CN). It should be understood by the skilled in the art that "UE" is a non-limiting term which means any terminal, wireless communication terminal, user equipment, Device to Device (D2D) terminal, or node e.g. smart phone, laptop, mobile phone, sensor, relay, mobile tablets or even a car or any small base station communicating within a first cell (cell1) provided by a radio node 110.

Base stations such as the radio node 110, and in some embodiments the radio node 121, operate in the wireless communications network 100. The radio node 110 provides a first cell, referred to as cell1 and possibly a neighbour second cell, referred to as cell2. The radio node 110 may be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point or an Access Point Station (AP STA), an access controller, or any other network unit capable of communicating with UEs such as the UEs 121, 122 within a first cell, cell1, served by the radio node 110 may be referred to as a serving radio network node and communicates with the UEs 121, 122 with Downlink (DL) transmissions to the UEs 121, 122 and Uplink (UL) transmissions from the UEs 121, 122. The second cell, cell2, among neighbour cells, cellsn, to the cent is served by a second radio node, not shown in FIG. 1a, capable of communicating with UEs such as the UEs 121, 122.

Methods according to embodiments herein are performed by the radio node 110, 121. These nodes may be Distributed Nodes and functionality, e.g. comprised in a cloud 190 as shown in FIG. 1a may be used for performing or partly performing the methods.

Figure 1B:
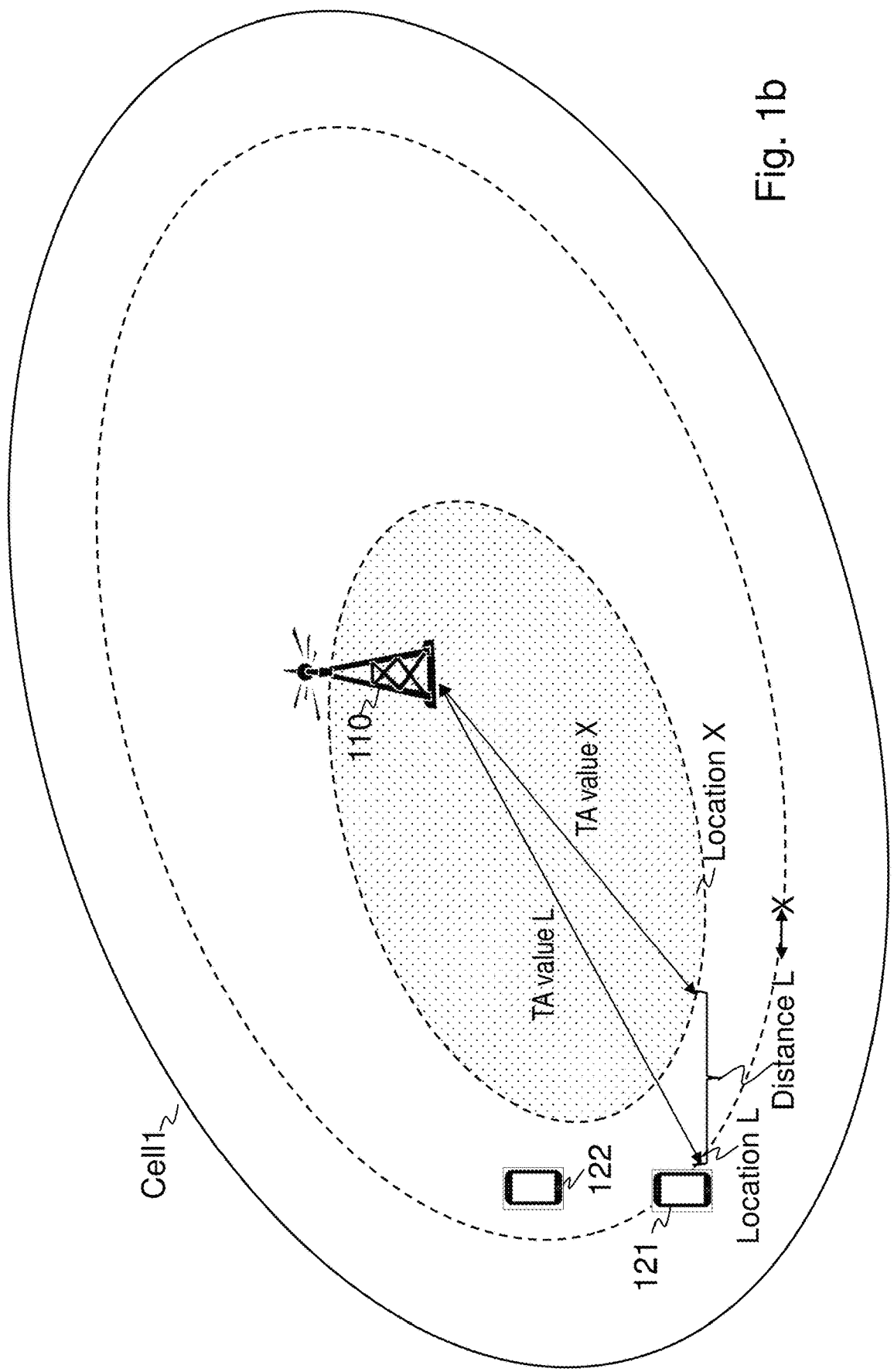
FIG. 1b is a schematic block diagram illustrating embodiments of a wireless communications network.

FIG. 1b shows a part of the wireless communications network 100 according to an example scenario wherein embodiments herein may be applied. The first cell, cent comprises a network degradation area, marked with dots in FIG. 1b. Cell1 is served by the radio node 110. The first UE 121 and the second UE 122 are located within cell1. The network degradation is located at location X. Location X is at a distance represented by TA value X from the radio node 110, where TA value X is a second timing advance value. The first UE 121 is located at location L. At location L, the first UE 121 may experience the network degradation. At location L, the first UE 121 is at a distance represented by TA value L from the radio node 110, where the TA value L is a first timing advance value estimated by the first UE 121 when being located at location L.

According to embodiments herein the one or more UEs 121, 122 will be provided with an indication that location X is suffering from the network degradation. The indication enables the one or more UEs 121, 122 to handling their respective fingerprints during the network degradation.

Figure 2:
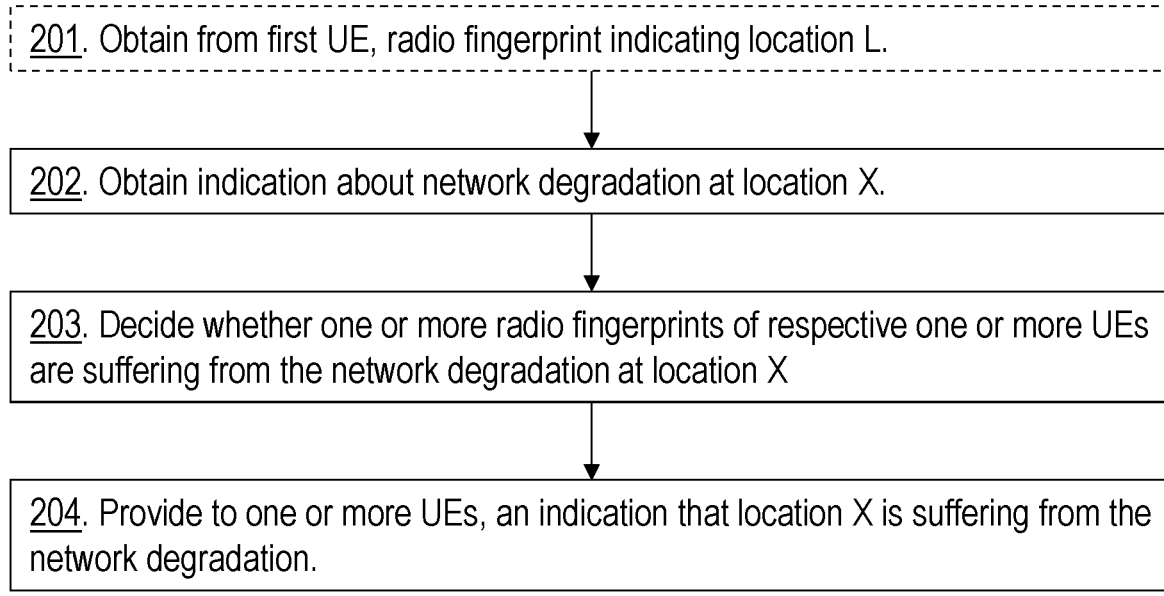
FIG. 2 is a flowchart depicting embodiments of a method in a radio node.

The method according to embodiments will now be described from the view of the radio node 110, 121 together with FIG. 2.

Example embodiments of a method performed by a radio node 110, 121 for handling a radio fingerprint during network degradation in a wireless communications network 100 will now be described with reference to a flowchart depicted in FIG. 2. It should be noted that the first UE 121 may in some embodiments be the radio node 121.

The method comprises the following actions, which actions may be taken in any suitable order. Actions that are optional are presented in dashed boxes in FIG. 2.

Action 201

Radio fingerprints are used for locating UEs such as the one or more UEs 121, 122 in the wireless communication network 100. In order to locate a UE, the radio node 110, 121 needs to obtain the radio fingerprint of the UE.

Therefore, in some embodiments, the radio node 110, 121 obtains a radio fingerprint of the first UE 121. The radio fingerprint indicates a location L of the first UE 121.

In some embodiments obtaining the radio fingerprint of the UE 121 further comprises obtaining a first TA value L associated with the location L of the UE 121. A TA value informs the radio node 110, 121 about a distance between a UE, such as e.g. the UE 121, and a base station, such as e.g. the radio node 110.

Action 202

In order to handle a radio fingerprint during a network degradation, the radio node 110, 121 needs to be aware of the degradation. In an example scenario the radio node 110, 121 obtains an indication about a network degradation at location X as can be seen in FIG. 1b described above. The network degradation may result in corrupted radio fingerprints, incorrect positioning of UEs such as e.g. the first UE 121, and failure in location base services if not handled.

The radio node 110, 121, obtains an indication about the network degradation at location X in the wireless communications network 100. The indication about the network degradation may be obtained by the radio node 110, 121 by detecting the network degradation at location X. The indication may further be obtained by receiving the indication from any of the one or more UEs 121, 122, where any of the one or more UEs 121, 122 has detected the network degradation at location X.

One way to determine the location X of the network degradation is to use the TA value of the location X. As mentioned above, the TA value of a location may be used to determine a distance between the radio node 110 and the location X.

In some embodiments the obtaining of the indication about the network degradation further comprises detecting that location X is associated with a second TA value X. The location of location X is then calculated. The calculated location of location X may be a geographical location or position. The radio node 110, 121 may calculate the location of location X by using any existing positioning methods, such as e.g. OTDOA.

Depending on the type of network degradation the handling of radio fingerprints during the network degradation may be decided later on.

The obtained indication about the network degradation may comprise any one or more out of a received Reference Signal Receive Power (RSRP) that is below a threshold, a received Reference Signal Receive Quality (RSRQ) that is below a threshold, an indication that a cell is added to the network, an indication that a cell is removed from the network, an indication that a cell or a network equipment went down due to hardware or software problems, and an indication of a radio link failure.

In some embodiments, the radio node 110, 121 may be represented by any one of a base station 110 and the UE 121.

Action 203

The radio node 110, 121 then decides whether one or more radio fingerprints of respective one or more UEs 121, 122 are suffering from the network degradation at location X.

The radio node 110, 121 may compare the location of the first UE 121 with the location X of the network degradation to determine if the first UE 121 is close enough to the degraded area to suffer from the network degradation, i.e. is at a distance from the location X that is below a first threshold.

So, in some embodiments deciding whether the one or more radio fingerprints of respective one or more UEs 121, 122 are suffering from the network degradation at location X comprises that the radio node 110, 121 decides whether the obtained radio fingerprint of the first UE 121 is suffering from the network degradation at location X by checking whether the obtained radio fingerprint at location L is at a first distance from location X that is below a first threshold.

As mentioned above, a TA value may be used to estimate a location of a UE, such e.g. the first UE 121, by determining the distance between the UE and a base station, such as e.g. the radio node 110, 121. With two TA values, e.g. TA value X and TA value L, a distance between the locations represented by the two TA value may be determined. The determined distance may then be used to decide if the radio fingerprint indicating location L, and associated with TA value L, is close enough to the network degradation at location X, associated with TA value X.

Therefore, in some of these embodiments the radio node 110, 121 decides that the radio fingerprint indicating location L suffers from the detected network degradation, when the TA value L and the TA value X represents a second distance between location X and Location L that is below a second threshold.

Using TA value to decide if the radio fingerprint is suffering from the network degradation may sometimes not be accurate enough.

In some embodiments the radio node 110, 121 decides that the radio fingerprint indicating location L suffers from the detected network degradation by calculating the location of location L. The radio node 110, 121 may then determine that the location L is at a third distance from the location X that is below a third threshold, which third distance is more accurate than the second distance. The calculated location of location L may be a geographical location or position. The radio node 110, 121 may calculate the location of location L by using any existing positioning methods, such as e.g. OTDOA. Each time the TA value, such as e.g. TA value L, of a UE, such as e.g. the first UE 121, with a radio fingerprint indicating a location, such as e.g. location L, is within a predefined distance, e.g. the second distance, to TA value X, the radio node 110, 121, may calculate, e.g. via OTDOA, the location, such as e.g. the location of location L, of the UE, such as e.g. the first UE 121. If the calculated location is within a predefined distance, such as e.g. the third distance, from location X, then the radio node 110, 121 may decide that the radio fingerprint indicating the location, such as e.g. location L, suffers from the detected network degradation. Otherwise the radio node 110, 121 may decide that the radio fingerprint indicating the location, such as e.g. location L, does not suffer from the detected network degradation. Using the geographical location instead of TA values may result in a more accurate decision. The UE, such as e.g. the first UE 121, may be a low complexity that has limited positioning capabilities, then TA values may be used instead of a geographical location or position.

Action 204

Any UE approaching the network degradation at location X will not be aware that location X suffers from the degradation. To enable the UEs, such as e.g. the one or more UEs 121, 122, to handle their radio fingerprint correctly they need to know about the network degradation.

So, when one or more radio fingerprints of respective one or more UEs 121, 122 are suffering from the network degradation at location X, the radio node 110, 121 provides an indication to the one or more UEs 121, 122. The indication indicates that the location X is suffering from the network degradation. The indication enables the one or more UEs 121, 122 to handling their respective radio fingerprints during the network degradation at location X. The indication may be provided to the one or more UEs 121, 122 by e.g. broadcasting, multicasting or including the indication in system information blocks or in a dedicated signalling message.

Additional knowledge about the network degradation may improve the performance of handling the radio fingerprints.

Therefore, in some embodiments the indication that the location X is suffering from the network degradation may indicate any one or more of the presence of a network degradation, the radio fingerprint is not valid, the type of area suffering from the network degradation and the type of network degradation.

Depending on the type and severeness of network degradation, it may impact radio fingerprints in a whole cell, or only certain area.

In some of these embodiments the indication indicating the type of area suffering from the network degradation indicates any one of that the radio fingerprint not being valid is applied at a cell level and that the radio fingerprint not being valid is applied to an area where the TA value L and the TA value X represents the second distance between location X and location L that is below the second threshold.

It may be that even though the network degradation is present, the one or more UEs 121, 122 may be able to use their radio fingerprints.

Therefore, the indication indicating that the radio fingerprint is not valid, may indicates any one of the radio fingerprint cannot be used and the radio fingerprint can be used with increased uncertainty.

In some embodiments the indication indicating the type of network degradation indicates any one of that a radio network degradation has occurred, that a cell has been added to the network and that a cell has been removed from the network. A radio network degradation may e.g. be radio link failure, RSRP that is below a threshold, RSRQ that is below a threshold, a cell or a network equipment that went down due to hardware or software problem.

Embodiments mentioned above will now be further described and exemplified. The text below is applicable to and may be combined with any suitable embodiment described above.

Figure 3B:
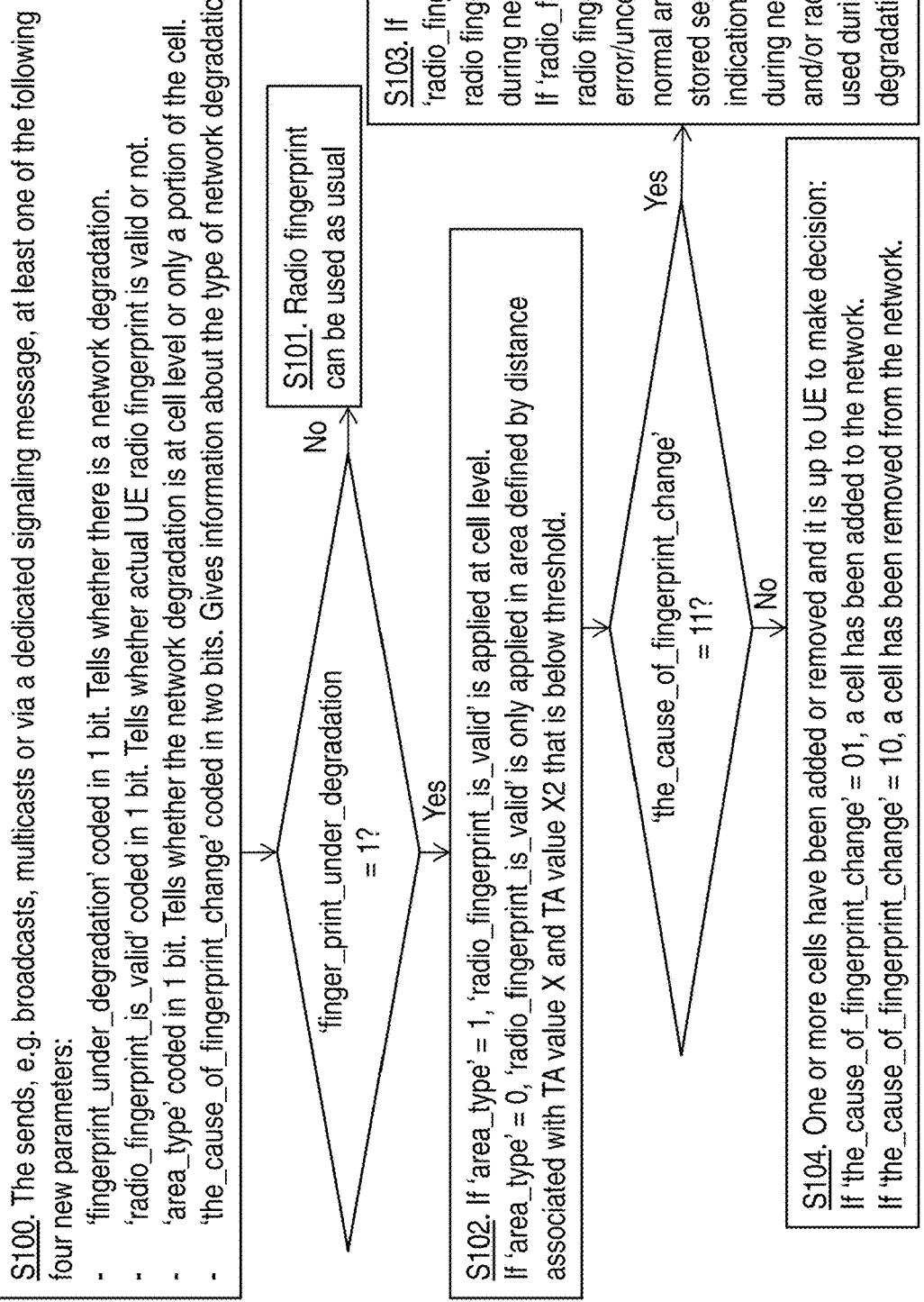
FIGS. 3 a, b, c, d and e are flowcharts depicting embodiments of a method.
Figure 3C:
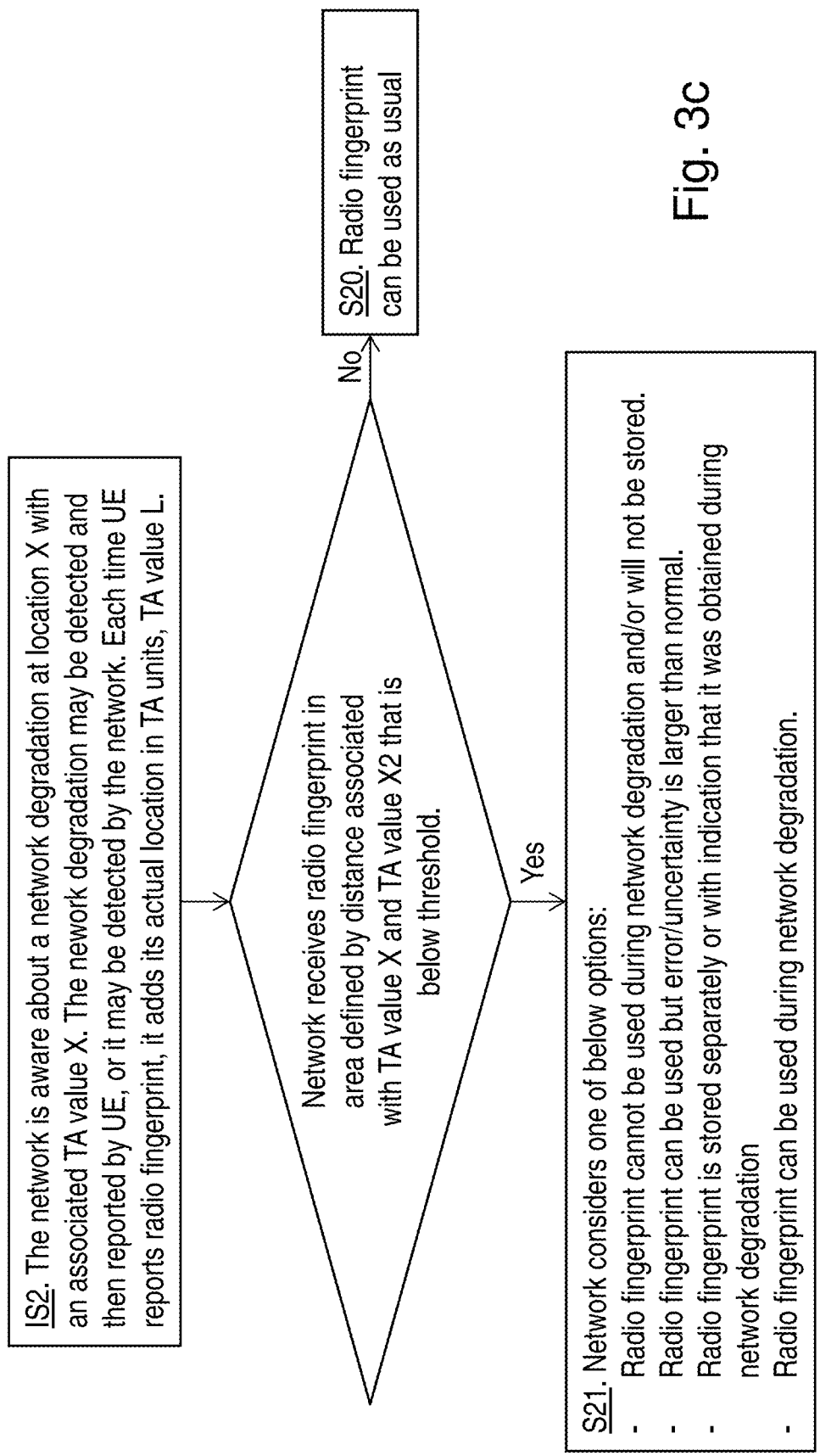
Figure 3D:
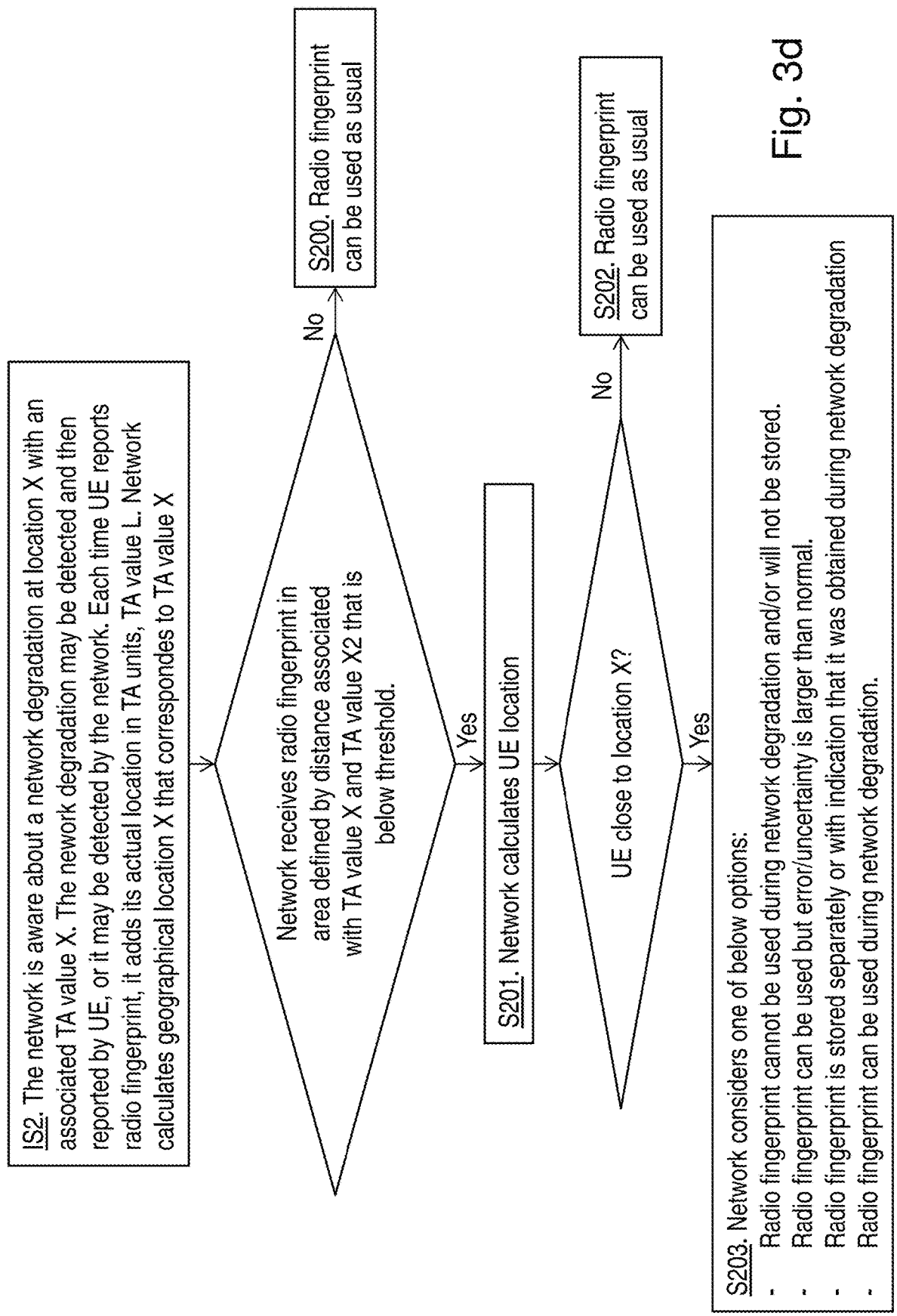
Figure 3E:
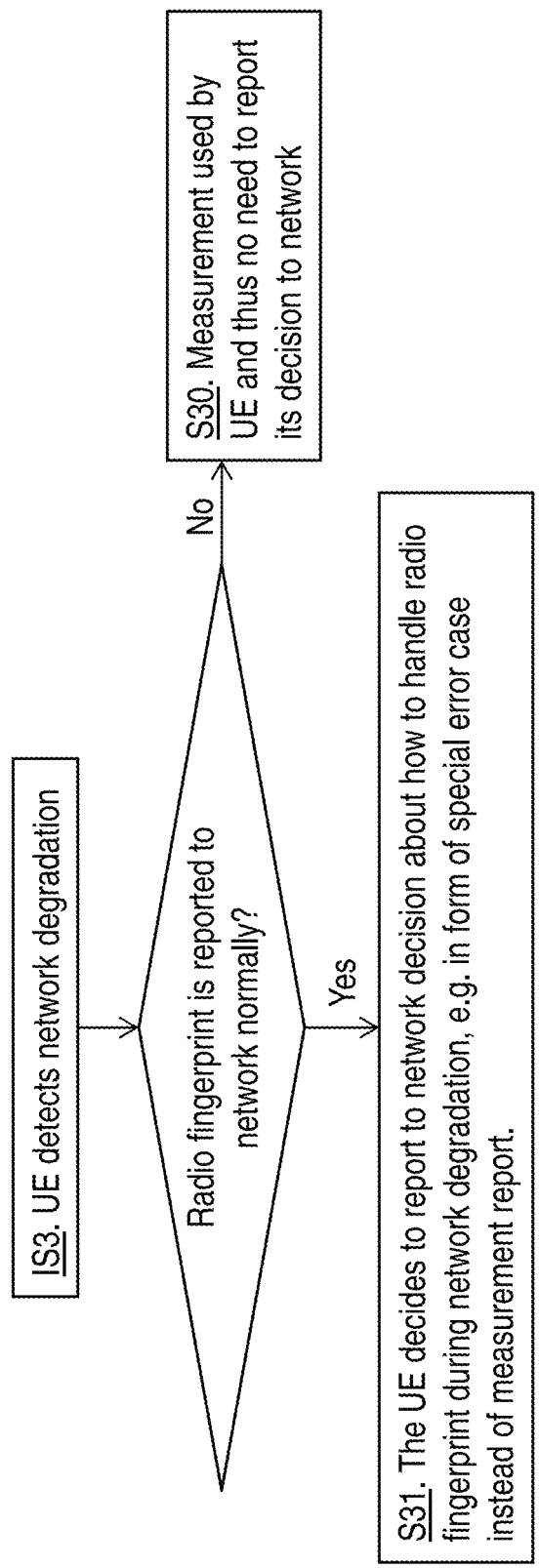

Actions IS1 and S10-S13 are related to Method 1-1 depicted in FIG. 3*a*, Actions IS1 and S100-104 are related to Method 1-2 depicted in FIG. 3*b*, Actions IS2 and S20-S21 are related to Method 2-1 depicted in FIG. 3*c*, Actions IS2 and S200-S203 are related to Method 2-2 depicted in FIG. 3*d* and Actions IS3 and S30-31 are related to Method 3 depicted in FIG. 3*e*.

These methods depict examples of detailed actions according to embodiments herein. In the FIGS. 3*a-e* the radio node 110 is referred to as network, network node or network side, the UEs 121, 122 is respectively referred to as UE.

The actions may be taken in any suitable order. Some actions are new according to embodiments herein and are marked so, and some steps are performed according prior art.

In the below example five embodiments of methods are described.

A first and second method, Method 1-1 and Method 1-2, respectively comprises actions performed at the network side, such as e.g. by the radio node 110, 121, and by a UE, such as e.g. the UE 121, 122, to handle radio fingerprints during network degradation.

A third and fourth method, Method 2-1 and Method 2-2, respectively comprises actions performed at the network side, such as e.g. the radio node 110, 121 to handle radio fingerprints during network degradation.

A fifth method, Method 3, comprise actions performed by a UE, such as e.g. the radio node 121, to handle radio fingerprints during network degradation.

Action IS1 is related to both Method 1-1 and Method 1-2 and will be described below.

Action IS1

The network, such as the radio node 110, 121, obtains an indication about a network degradation at location X. The Location X has an associated TA value X. The network degradation may be defined by the operator as e.g. when RSRP or RSRQ is below or above a certain threshold, when a cell, such as e.g. a radio link identity that is previously known to the UE, such as the one or more UEs 121, 122, in one area, goes down. Such a network degradation may be detected and then reported by a UE, such as the one or more UEs 121, 122, or it may be detected by the network. The UE such as the one or more UEs 121, 122, does not take a decision on the validity of its fingerprint. The UE, such as the one or more UEs 121, 122, relies on a decision from the network such as the radio node 110, 121.

Actions S10-S13 are related to Method 1-1 and will be described below.

Action S10

The network, e.g. a radio node in a particular a cell, may provide an indication comprising one or more of the following three new parameters to the UE, such as the one or more UEs 121, 122:

'fingerprint_under_degradation', such as e.g. the provided indication indicating the presence of a network degradation, coded in 1 bit.

'radio_fingerprint_is_valid', such as e.g. the provided indication indicating the fingerprint is not valid, coded in 1 bit.

'area_type', such as e.g. the provided indication indicating the type of area suffering from network degradation, coded in 1 bit.

The indication may be provided to the UE, such as the one or more UEs 121, 122, by e.g. broadcasting, multicasting or including the indication in system information blocks or in a dedicated signalling message.

Action S11

The parameter fingerprint_under_degradation indicates whether there is a network degradation present or not. When set to '1', the parameter indicates that there is a network degradation. The network degradation may be at either cell level, or only at a portion of a cell. When set to '0', the parameter indicates that no network degradation is present. When indicating that no network degradation is present, the radio fingerprint can be used.

Action S12

The parameter area_type indicates the type of area suffering from the network degradation. When set to '1', the parameter indicates that the parameter radio_fingerprint_is_valid is applied at cell level, meaning e.g. that the cell is affected by the network degradation. When set to '0', the parameter indicates the parameter radio_fingerprint_is_valid is applied in a limited area. The area may be defined as a distance associated with TA value X and a TA value X2, where TA value X2 is different from TA value X, that is below a threshold.

Action S13

The parameter radio_fingerprint_is_valid indicates to the UEs, such as the one or more UEs 121, 122, whether its respective radio fingerprint is valid or not. When set to '1', the parameter indicates any one or more of:

The radio fingerprint may be used but the error or uncertainty is increased, the radio fingerprint will be stored separately or with an indication that the radio fingerprint was obtained during a radio degradation, or the radio fingerprint may be used during the network degradation.

When set to '0', the parameter indicates that the radio fingerprint cannot be used for the duration of the network degradation or that the radio fingerprint will not be stored.

Actions S100-S104 are related to Method 1-2 and will be described below.

Action S100

The network, such as the radio node 110, 121, in particular a cell provides one or more of the three new parameters described above in Action S10 and a fourth new parameter to one or more UEs, such as the one or more UEs 121, 122:

'the_cause_of_fingerprint_change', such as e.g. the provided indication indicating the type of network degradation coded in e.g. two bits. More than two bits may be used depending on the number of different types network degradation.

This parameter provides the one or more UEs, such as the one or more UEs 121, 122, with additional information about the type of degradation, e.g. to enable the one or more UEs, such as the one or more UEs 121, 122, to distinguish a network degradation that has resulted from an added or removed cell from any other type of network degradation, such as e.g. RSRP or RSRQ is below a certain threshold, a radio link failure or a cell outage.

Action S101

As mention above, the parameter fingerprint_under_degradation indicates whether there is a network degradation present or not. When set to '1', the parameter indicates that there is a network degradation. The network degradation may be at either cell level, or only at a portion of a cell. When set to '0', the parameter indicates that no network degradation is present. When indicating that no network degradation is present, the radio fingerprint can be used.

Action S102

As mention above, the parameter area_type indicates the type of area suffering from the network degradation. When set to '1', the parameter indicates that the parameter radio_fingerprint_is_valid is applied at cell level, meaning e.g. that the whole cell is affected by the network degradation. When set to '0', the parameter indicates the parameter radio_fingerprint_is_valid is applied in a limited area. The area may be defined as a distance associated with TA value X and a TA value X2, where TA value X2 is different from TA value X, that is below a threshold.

Action S103

When the parameter 'the_cause_of_fingerprint_change' indicates that a network degradation, such as e.g. RSRP or RSRQ is below a certain threshold, a radio link failure or a cell outage, has occurred, e.g. when the parameter is set to '11', then the UE, such as the one or more UEs 121, 122, evaluates the parameter radio_fingerprint_is_valid. This parameter, as mentioned above, indicates to the UE, such as the one or more UEs 121, 122, whether its radio fingerprint is valid or not. When set to '1', the parameter indicates any one or more of that the radio fingerprint may be used, but the error or uncertainty is increased, the radio fingerprint will be stored separately or with an indication that the radio fingerprint was obtained during a radio degradation, or that the radio fingerprint may be used during the network degradation. When set to '0', the parameter indicates that the radio fingerprint cannot be used for the duration of the network degradation and/or that the radio fingerprint will not be stored.

Action S104

When the parameter 'the_cause_of_fingerprint_change' indicates that a cell has been added to or removed from the network, e.g. when the parameter is set to '01' or '10', then the UE, such as the one or more UEs 121, 122, may decide how to handle the radio fingerprint. The decision may be based on e.g. historical data. A UE, such as the one or more UEs 121, 122, at a certain time every day at a certain location, obtains a radio fingerprint comprising three different Physical Cell Identities (PCI) values. In an example scenario, the UE, such as the one or more UEs 121, 122, at one time at the same certain location, obtains a radio fingerprint that only comprises two different PCI values. The parameter the_cause_of_fingerprint_change', when set to e.g. 10, indicates to the UE, such as the one or more UEs 121, 122, that a cell has been removed from the network. In another example scenario, the UE, such as the one or more UEs 121, 122, at one time at the same certain location, obtains a radio fingerprint that comprises four different PCI values. The parameter the_cause_of_fingerprint_change', when set to e.g. 01, indicates to the UE, such as the one or more UEs 121, 122, that a cell has been added from the network. The additional information provided to the UE, such as the one or more UEs 121, 122, enables the UE, such as the one or more UEs 121, 122, to handle the radio fingerprint.

Action IS2 is related to both Method 2-1 and Method 2-2 and will be described below.

Action IS2

The network, such as the radio node 110, 121, obtains an indication about a network degradation at location X. Location X has an associated TA value X. The network degradation may be defined by the operator as e.g. when RSRP or RSRQ is below a certain threshold, when a cell, such as e.g. a radio link identity that is previously known to the UE in one area, goes down. Such a network degradation may be detected and then reported by a UE, such as the one or more UEs 121, 122, or it may be detected by the network, such as the radio node 110, 121, The area suffering from the network degradation may be defined as a distance associated with TA value X and a TA value X2, where TA value X2 is different from TA value X, that is below a threshold. The network, such as the radio node 110, 121, may calculate, e.g. by any existing positioning methods, such as e.g. OTDOA, the location of location X. The calculated location of location X may be a geographical location or position.

Actions S20-S21 is related to Method 2-1 and will be described below.

Action S20

The network obtains a radio fingerprint from a UE, such as the first UE 121, together with a TA value L. The network decides that the obtained radio fingerprint suffers from the network degradation by determining that a distance associated with TA value X and TA value L is below the threshold defined in Action IS2. If the distance is above the threshold, the radio fingerprint is not suffering from the network degradation and the radio fingerprint can be used.

Action S21

When decided that the obtained radio fingerprint suffers from the network degradation, the network decides any one of:

That the obtained radio fingerprint cannot be used for the duration of the network degradation and/or will not be stored, that the obtained radio fingerprint can be used, but the error or uncertainty is increased, that the obtained radio fingerprint will be stored separately or with an indication that the radio fingerprint was obtained during a radio degradation, or that the radio fingerprint may be used during the network degradation.

Actions S200-S203 is related to Method 2-2 and will be described below.

Action S200

The network, such as the radio node 110, 121, obtains a radio fingerprint from a UE, such as the first UE 121, together with a TA value L. The network, such as the radio node 110, 121, decides that the obtained radio fingerprint may suffer from the network degradation by determining that a distance associated with TA value X and TA value L is below the threshold defined in Action IS2. If the distance is above the threshold, the radio fingerprint is not suffering from the network degradation and the radio fingerprint can be used.

Action S201

When determined that the distance is below the threshold, the network, such as the radio node 110, 121, calculates the location of location L of the UE, e.g. by any existing positioning methods, such as e.g. OTDOA. The calculated location of location L may be a geographical location or position.

Action S202

The network, such as the radio node 110, 121, decides that the obtained radio fingerprint suffers from the network degradation by determining that location L is at a distance, from location X that is below a threshold. By using the calculated locations, rather than only the TA values, when deciding whether or not the radio fingerprint is suffering from the network degradation, a more accurate decision may be made. If the distance is above the threshold, the radio fingerprint is not suffering from the network degradation and the radio fingerprint can be used.

Action S203

When decided that the obtained radio fingerprint suffers from the network degradation, the network, such as the radio node 110, 121, decides any one of:

The obtained radio fingerprint cannot be used for the duration of the network degradation and/or will not be stored, the obtained radio fingerprint can be used, but the error or uncertainty is increased, the obtained radio fingerprint will be stored separately or with an indication that the radio fingerprint was obtained during a radio degradation, or that the radio fingerprint may be used during the network degradation.

Actions IS3 and S30-S31 is related to Method 3 and will be described below.

Action IS3

The UE, such as the first UE 121, detects a network degradation at location X by obtaining an indication about the network degradation. The indication may indicate the TA value X associated with location X. The detection may be based on real time changes in UE radio conditions, such as e.g. a radio link failure or loss of signalling link to a cell, while also taking historical data into consideration.

Action S30

The UE, such as the first UE 121, decides to use the obtained radio fingerprint and does not report its decision to the network.

Action S31

The UE, such as the first UE 121, decides to report its decision about how to handle the radio fingerprint during network degradation, e.g. in form of a special error case instead of a measurement report.

Figure 4A:
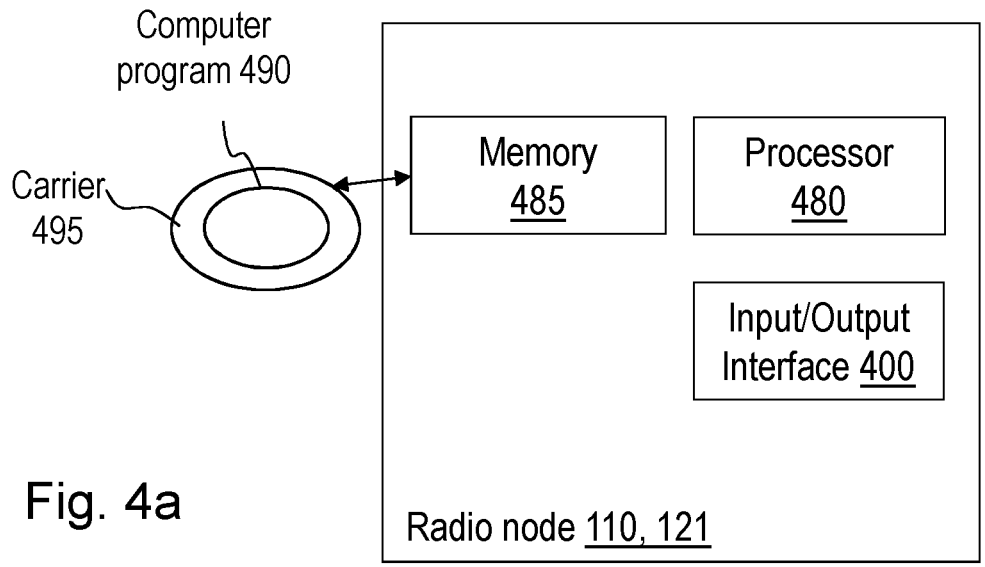
FIGS. 4 a and b are schematic block diagrams illustrating embodiments of a radio node.
Figure 4B:
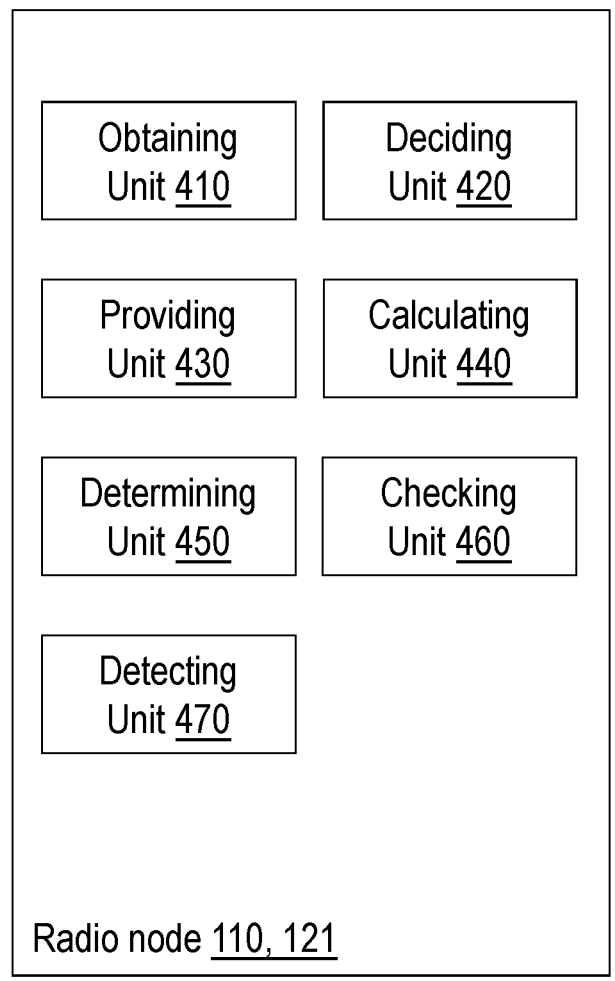

To perform the method actions, the radio node 110, 121 may comprise an arrangement depicted in FIGS. 4a and b. The radio node 110, 121 is configured to handle a radio fingerprint during network degradation in a wireless communications network 100.

The radio node 110, 121 may be represented by any one of: A base station 110, and the UE 121.

The radio node 110, 121 may comprise an input and output interface 400 configured to communicate with e.g. the radio node 110, 121, the one or more UEs 121, 122 and with network nodes in the wireless communications network 100.

The radio node 110, 121 is further configured to, e.g. by means of an obtaining unit 410 in the radio node 110, 121, obtain an indication about a network degradation at location X in the wireless communications network 100.

The obtained indication about the network degradation may be adapted to comprise any one or more out of: A received RSRP that is below a threshold, a received RSRQ that is below a threshold, an indication that a cell is added to the network, an indication that a cell is removed from the network, an indication that a cell or a network equipment went down due to hardware or software problems, and an indication of a radio link failure.

The radio node 110, 121 may further be configured to, e.g. by means of the obtaining unit 410 in the radio node 110, 121, obtain a radio fingerprint of a first UE 121, which radio fingerprint is adapted to indicate a location L of the first UE 121.

The radio node 110, 121 may further be configured to, e.g. by means of the obtaining unit 410 in the radio node 110, 121, obtain the radio fingerprint of the UE 121 by further obtaining a first Timing Advance, TA, value L associated with the location L of the UE 121, The radio node 110, 121 may further be configured to, e.g. by means of the obtaining unit 410 in the radio node 110, 121, obtain the indication about the network degradation by further, e.g. by means of a detecting unit 470 in the radio node 110, 121, detecting that location X is associated with a second TA value X and, e.g. by means of a calculating unit 440 in the radio node 110, 121, calculating the location of location X.

The radio node 110, 121 is further configured to, e.g. by means of a deciding unit 420 in the radio node 110, 121, decide whether one or more radio fingerprints of respective one or more UEs 121, 122 are suffering from the network degradation at location X.

The radio node 110, 121 may further be configured to, e.g. by means of the deciding unit 420 in the radio node 110, 121, decide whether the one or more radio fingerprints of respective one or more UEs 121, 122 are suffering from the network degradation at location X by further deciding whether the obtained radio fingerprint of the first UE 121 is suffering from the network degradation at location X by, e.g. by means of a checking unit 460 in the radio node 110, 121, checking whether the obtained radio fingerprint at location L is at a first distance from location X that is below a first threshold.

The radio node 110, 121 may further be configured to, e.g. by means of the deciding unit 420 in the radio node 110, 121, decide that the radio fingerprint indicating location L suffers from the detected network degradation, when the TA value L and the TA value X represents a second distance between location X and Location L that is below a second threshold.

The radio node 110, 121 may further be configured to, e.g. by means of the deciding unit 420 in the radio node 110, 121, decide that the radio fingerprint indicating location L suffers from the detected network degradation by the radio node 110, 121, e.g. by means of the calculating unit 440 in the radio node 110, 121, calculate the location of location L, and e.g. by means of a determining unit 450 in the radio node 110, 121, determine that the location L is at a third distance from the location X that is below a third threshold, which third distance is more accurate than the second distance.

The radio node 110, 121 is further configured to, e.g. by means of a providing unit 430 in the radio node 110, 121, when one or more radio fingerprints of respective one or more UEs 121, 122 are suffering from the network degradation at location X, provide to the one or more UEs 121, 122 an indication adapted to indicate that the location X is suffering from the network degradation. The indication is adapted to enable the one or more UEs 121, 122 to handling their respective radio fingerprints during the network degradation at location X.

The indication that the location X is suffering from the network degradation may be adapted to indicate any one or more of: The presence of a network degradation, the radio fingerprint is not valid, the type of area suffering from the network degradation and the type of network degradation.

The indication indicating type of area suffering from the network degradation may be adapted to indicate any one of: That the radio fingerprint not being valid is applied at a cell level and that the radio fingerprint not being valid is applied to an area where the TA value L and the TA value X represents the second distance between location X and Location L that is below the second threshold The indication indicating that the radio fingerprint is not valid, may be adapted to indicate any one of: The radio fingerprint cannot be used and the radio fingerprint can be used with increased uncertainty.

The indication indicating the type of network degradation is adapted to indicate any one of: That a network degradation has occurred, that a cell has been added to the network and that a cell has been removed from the network.

Those skilled in the art will also appreciate that the units in the radio node 110, 121 mentioned above may refer to a combination of analogue and digital circuits, and/or one or more processors configured with software and/or firmware, e.g. stored in the radio node 110, 121, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The embodiments herein may be implemented through a respective processor or one or more processors, such as a processor 480 of a processing circuitry in the radio node 110, 121 depicted in FIG. 4a, together with respective computer program code for performing the functions and actions of the embodiments herein. The program code mentioned above may also be provided as a computer program product, for instance in the form of a data carrier carrying computer program code for performing the embodiments herein when being loaded into the radio node 110, 121. One such carrier may be in the form of a CD ROM disc. It is however feasible with other data carriers such as a memory stick. The computer program code may furthermore be provided as pure program code on a server and downloaded to the radio node 110, 121.

The radio node 110, 121 may further comprise a memory 485 comprising one or more memory units. The memory 485 comprises instructions executable by the processor 480 in the radio node 110, 121. The memory 485 is arranged to be used to store e.g. TA values, locations, measurement report, measurements, decisions and applications to perform the methods herein when being executed in the radio node 110, 121.

In some embodiments, a respective computer program 490 comprises instructions, which when executed by the respective at least one processor 480, cause the at least one processor 480 of the radio node 110, 121 to perform the actions above.

In some embodiments, a respective carrier 495 comprises the respective computer program 490, wherein the carrier is one of an electronic signal, an optical signal, an electromagnetic signal, a magnetic signal, an electric signal, a radio signal, a microwave signal, or a computer-readable storage medium.

Figure 5:
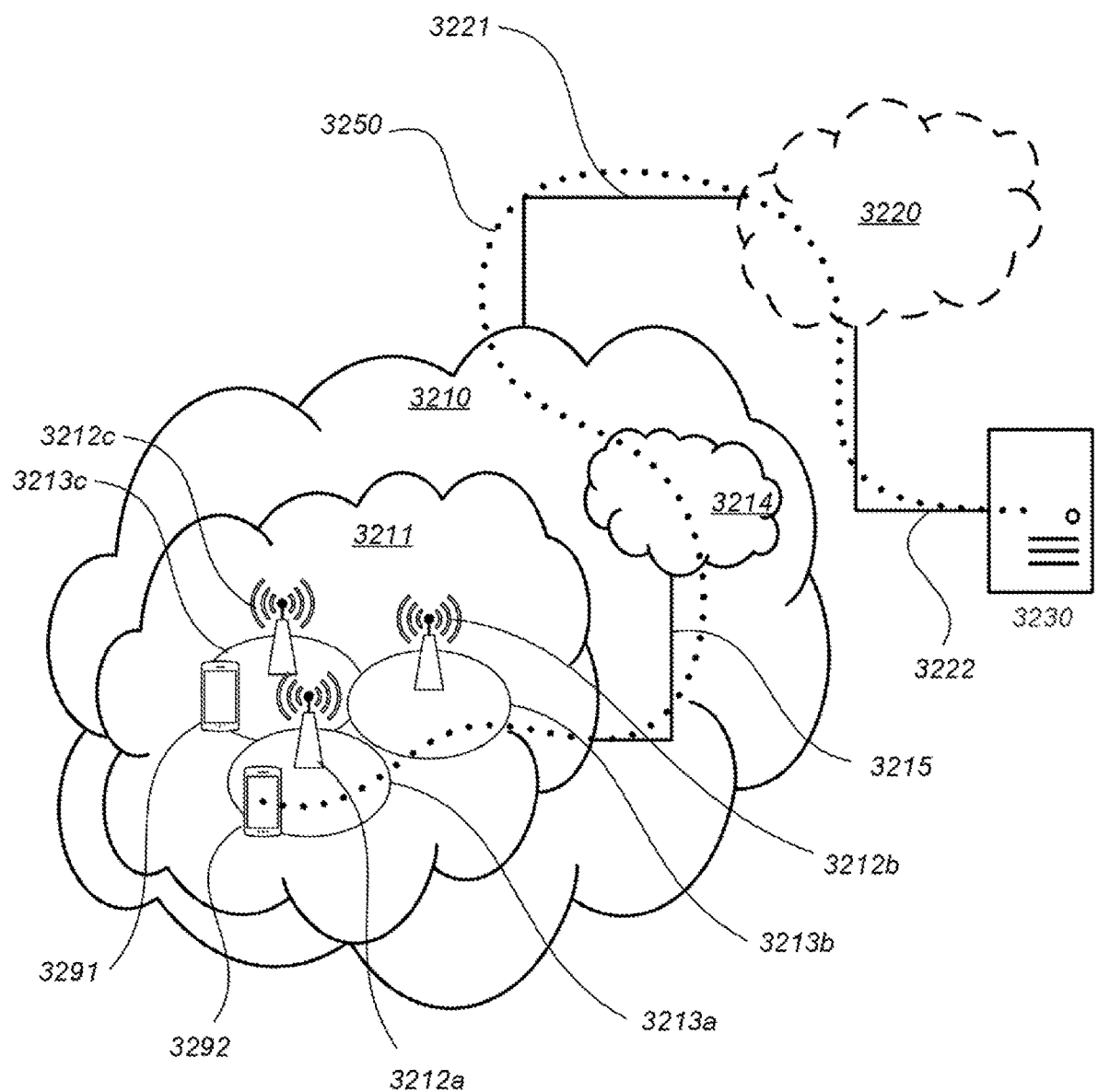
FIG. 5 schematically illustrates a telecommunication network connected via an intermediate network to a host computer.

Further Extensions and Variations With reference to FIG. 5, in accordance with an embodiment, a communication system includes a telecommunication network 3210 such as the wireless communications network 100, e.g. a NR network, such as a 3GPP-type cellular network, which comprises an access network 3211, such as a radio access network, and a core network 3214. The access network 3211 comprises a plurality of base stations 3212a, 3212b, 3212c, such as the radio node 110, 121, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the UEs 121 and 122 such as a Non-AP STA 3291 located in coverage area 3213c is configured to wirelessly connect to, or be paged by, the corresponding base station 3212c. A second UE 3292 e.g. the wireless device 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 5 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 6. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 6) served by the base station 3320. The communication interface 3326 may be configured to facilitate a connection 3360 to the host computer 3310. The connection 3360 may be direct or it may pass through a core network (not shown in FIG. 6) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 6 may be identical to the host computer 3230, one of the base stations 3212a, 3212b, 3212c and one of the UEs 3291, 3292 of FIG. 5, respectively. This is to say, the inner workings of these entities may be as shown in FIG. 6 and independently, the surrounding network topology may be that of FIG. 5.

Figure 6:
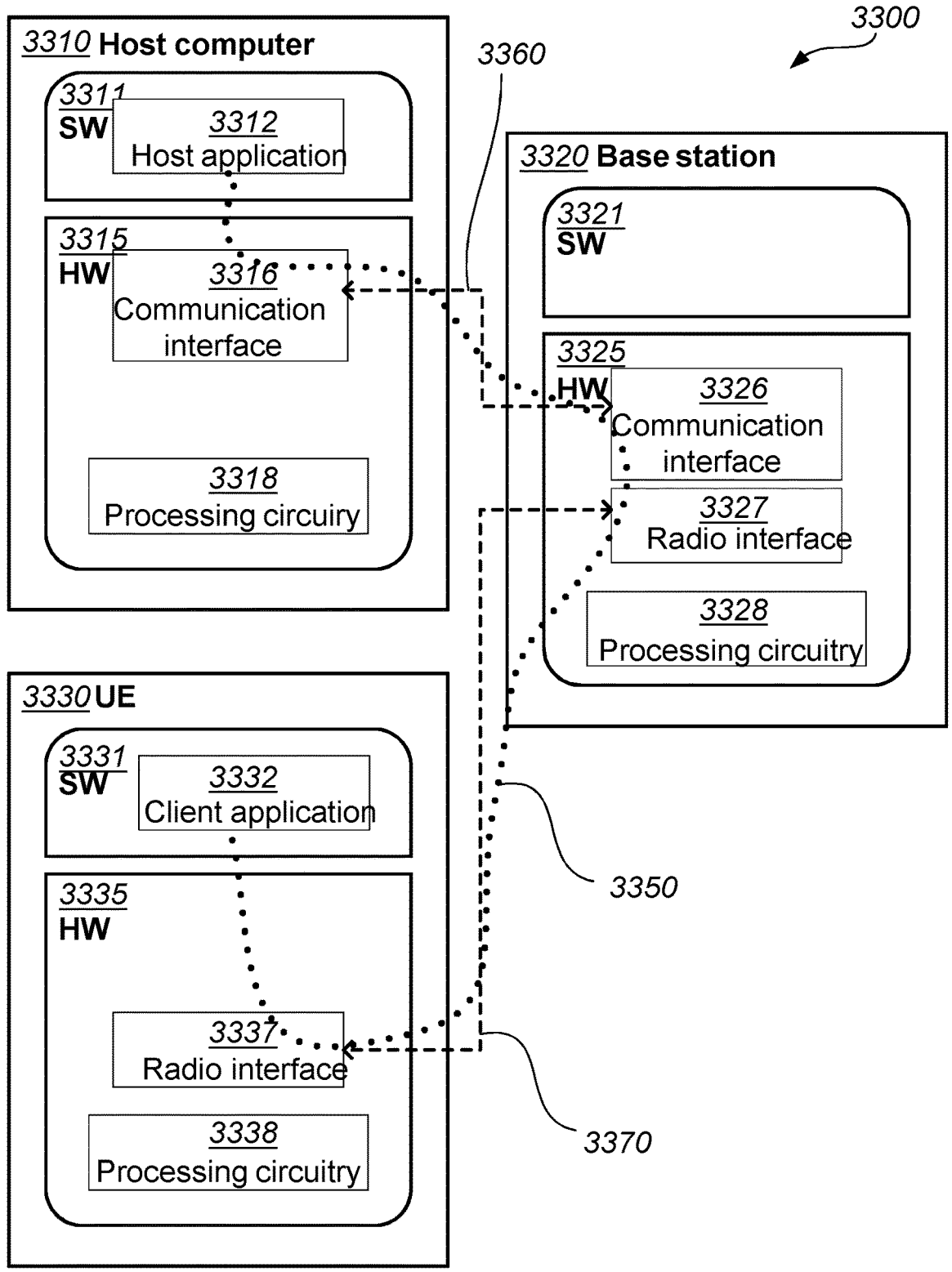
FIG. 6 is a generalized block diagram of a host computer communicating via a base station with a user equipment over a partially wireless connection.

In FIG. 6, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 7 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 7 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 8 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 8 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

Figures 9, 10:
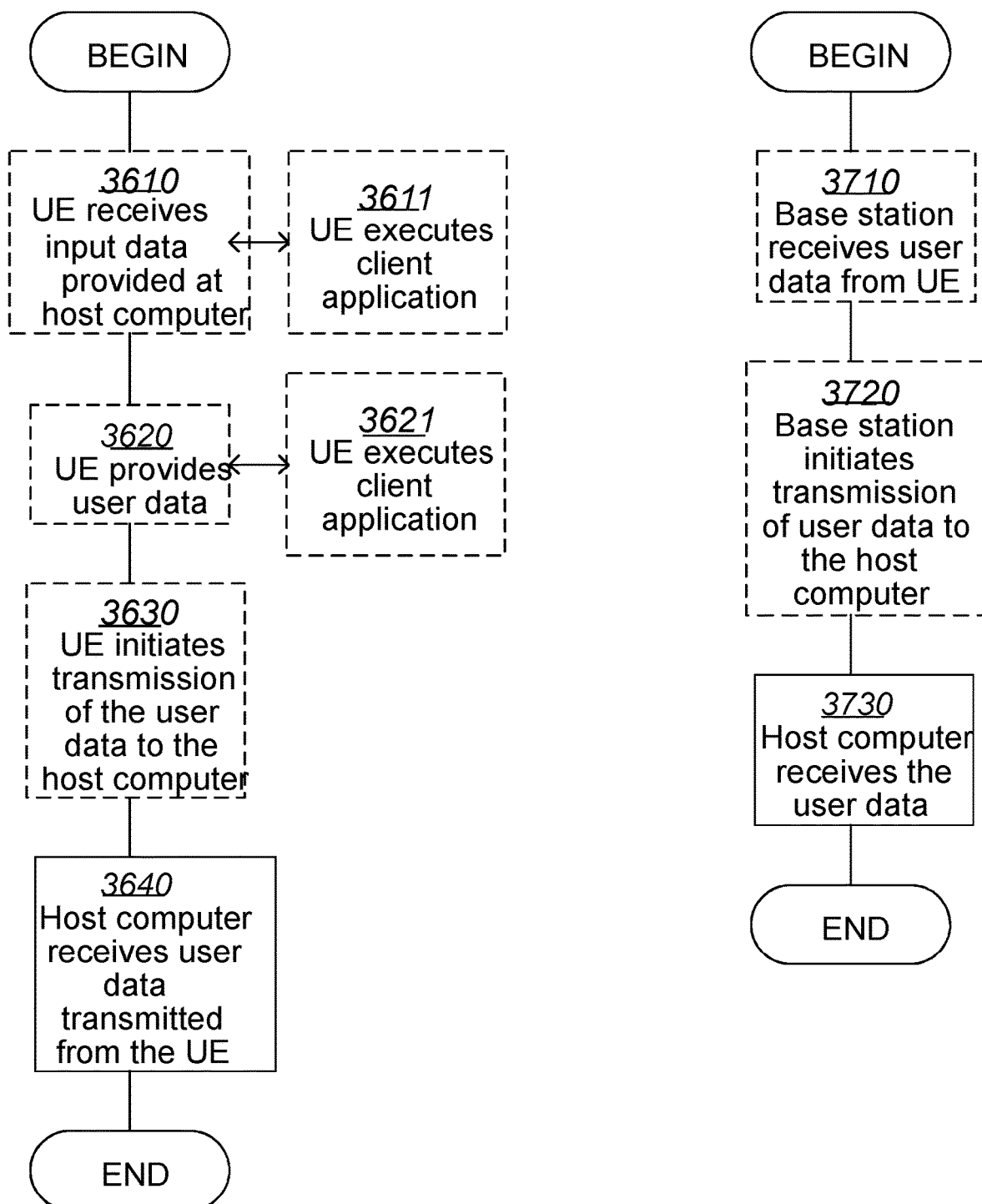

FIG. 9 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 9 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 10 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 10 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used

The invention claimed is:

1. A method performed by a radio node for handling a radio fingerprint during network degradation in a wireless communications network, the method comprising:
    obtaining an indication about a network degradation at location X in the wireless communications network;
    deciding whether one or more radio fingerprints of respective one or more User Equipments, UEs, are suffering from the network degradation at location X; and
    when one or more radio fingerprints of respective one or more UEs are suffering from the network degradation at location X, providing to the one or more UEs an indication that the location X is suffering from the network degradation, the indication enabling the one or more UEs to handle their respective radio fingerprints during the network degradation at location X.

2. The method according to claim 1, further comprising:
    obtaining a radio fingerprint of a first UE, the radio fingerprint indicating a location L of the first UE; and
    wherein deciding whether the one or more radio fingerprints of respective one or more UEs are suffering from the network degradation at location X comprises:
        deciding whether the obtained radio fingerprint of the first UE is suffering from the network degradation at location X by checking whether the obtained radio fingerprint at location L is at a first distance from location X that is below a first threshold.

3. The method according to claim 2, wherein obtaining the radio fingerprint of the UE further comprises obtaining a first Timing Advance, TA, value L associated with the location L of the UE, and wherein obtaining the indication about the network degradation further comprises detecting that location X is associated with a second TA value X and calculating the location of location X.

4. The method according to claim 3, wherein it is decided that the radio fingerprint indicating location L suffers from the detected network degradation, when the TA value L and the TA value X represents a second distance between location X and Location L that is below a second threshold.

5. The method according to claim 3, wherein it is decided that the radio fingerprint indicating location L suffers from the detected network degradation by:
    calculating the location of location L; and
    determining that the location L is at a third distance from the location X that is below a third threshold, which third distance is more accurate than the second distance.

6. The method according to claim 1, wherein the indication that the location is suffering from the network degradation indicates any one or more of:
    the presence of a network degradation;
    the radio fingerprint is not valid;

the type of area suffering from the network degradation; and the type of network degradation.

7. The method according to claim 6, wherein the indication indicating the type of area suffering from the network degradation indicates any one of:
 that the radio fingerprint not being valid is applied at a cell level; and
 that the radio fingerprint not being valid is applied to an area where the TA value L and the TA value X represents the second distance between location X and Location L that is below the second threshold.

8. The method according to claim 6, wherein the indication indicating that the radio fingerprint is not valid, indicates any one of:
 the radio fingerprint cannot be used; and
 the radio fingerprint can be used with increased uncertainty.

9. The method according to claim 6, wherein the indication indicating the type of network degradation indicates any one of:
 that a network degradation has occurred;
 that a cell has been added to the network; and
 that a cell has been removed from the network.

10. The method according to claim 1, wherein the obtained indication about the network degradation comprises any one or more out of:
 a received Reference Signal Receive Power (RSRP) that is below a threshold;
 a received Reference Signal Receive Quality (RSRQ) that is below a threshold;
 an indication that a cell is added to the network;
 an indication that a cell is removed from the network;
 an indication that a cell or a network equipment went down due to hardware or software problems; and
 an indication of a radio link failure.

11. The method according to claim 1, wherein the radio node is represented by any one of:
 a base station; and
 the UE.

12. A radio node configured to handle a radio fingerprint during network degradation in a wireless communications network, which radio node is further configured to:
 obtain an indication about a network degradation at location X in the wireless communications network;
 decide whether one or more radio fingerprints of respective one or more User Equipments, UEs, are suffering from the network degradation at location X; and
 when one or more radio fingerprints of respective one or more UEs are suffering from the network degradation at location X, provide to the one or more UEs an indication adapted to indicate that the location X is suffering from the network degradation, the indication enabling the one or more UEs to handle their respective radio fingerprints during the network degradation at location X.

13. The radio node according to claim 12, further being configured to:
 obtain a radio fingerprint of a first UE, the radio fingerprint being adapted to indicate a location L of the first UE; and wherein the radio node further is configured to decide whether the one or more radio fingerprints of respective one or more UEs are suffering from the network degradation at location X by further deciding whether the obtained radio fingerprint of the first UE is suffering from the network degradation at location X by checking whether the obtained radio fingerprint at location L is at a first distance from location X that is below a first threshold.

14. The radio node according to claim 13, further being configured to obtain the radio fingerprint of the UE by further obtaining a first Timing Advance, TA, value L associated with the location L of the UE, and further being configured to obtain the indication about the network degradation by further detecting that location X is associated with a second TA value X and calculating the location of location X.

15. The radio node according to claim 14, wherein it is decided that the radio fingerprint indicating location L suffers from the detected network degradation when the TA value L and the TA value X represents a second distance between location X and Location L that is below a second threshold.

16. The radio node according to claim 14, wherein it is decided that the radio fingerprint indicating location L suffers from the detected network degradation by the radio node further being configured to:
 calculate the location of location L; and
 determine that the location L is at a third distance from the location X that is below a third threshold, which third distance is more accurate than the second distance.

17. The radio node according to claim 12, wherein the indication that the location X is suffering from the network degradation indicates any one or more of:
 the presence of a network degradation;
 the radio fingerprint is not valid;
 the type of area suffering from the network degradation; and
 the type of network degradation.

18. The radio node according to claim 17, wherein the indication indicating type of area suffering from of the network degradation indicates any one of:
 that the radio fingerprint not being valid is applied at a cell level; and
 that the radio fingerprint not being valid is applied to an area where the TA value L and the TA value X represents the second distance between location X and Location L that is below the second threshold.

19. The radio node according to claim 17, wherein the indication indicating that the radio fingerprint is not valid, indicates any one of:
 the radio fingerprint cannot be used; and
 the radio fingerprint can be used with increased uncertainty.

20. The radio node according to claim 17, wherein the indication indicating the type of network degradation is adapted to indicate any one of:
 that a network degradation has occurred,
 that a cell has been added to the network; and
 that a cell has been removed from the network.

* * * * *